(12) United States Patent
Leck

(10) Patent No.: US 10,518,679 B2
(45) Date of Patent: Dec. 31, 2019

(54) HEADREST ASSEMBLY

(71) Applicant: Ford Global Technologies, LLC, Dearborn, MI (US)

(72) Inventor: Matthew Leck, Ruislip (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/124,488

(22) Filed: Sep. 7, 2018

(65) Prior Publication Data

US 2019/0111818 A1 Apr. 18, 2019

(30) Foreign Application Priority Data

Oct. 17, 2017 (GB) .................................. 1717038.2

(51) Int. Cl.
| | |
|---|---|
| *B60N 2/832* | (2018.01) |
| *B60N 2/30* | (2006.01) |
| *B60N 2/876* | (2018.01) |
| *B60N 2/868* | (2018.01) |
| *B60N 2/02* | (2006.01) |
| *B60N 2/80* | (2018.01) |

(52) U.S. Cl.
CPC ........... *B60N 2/832* (2018.02); *B60N 2/3081* (2013.01); *B60N 2/868* (2018.02); *B60N 2/876* (2018.02); *B60N 2002/0216* (2013.01); *B60N 2002/899* (2018.02)

(58) Field of Classification Search
CPC ........ B60N 2/832; B60N 2/876; B60N 2/868; B60N 2/3081

USPC .......................................... 297/406, 407, 238
See application file for complete search history.

(56) References Cited

U.S. PATENT DOCUMENTS

| | | | |
|---|---|---|---|
| 8,840,182 B2* | 9/2014 | Onji ....................... | B60N 2/062 297/406 |
| 2006/0170271 A1 | 8/2006 | Coccoli | |
| 2010/0123344 A1 | 5/2010 | Villeminey | |
| 2011/0012386 A1* | 1/2011 | Brncick .................. | B60N 2/01 296/64 |

FOREIGN PATENT DOCUMENTS

| | | | |
|---|---|---|---|
| CN | 204172726 | U | 2/2015 |
| DE | 4227697 | A1 | 2/1994 |
| DE | 19722785 | A1 | 12/1998 |
| DE | 10136827 | C1 | 1/2003 |
| DE | 202006013033 | U1 | 11/2006 |
| EP | 1470950 | A2 | 10/2004 |
| FR | 2885853 | A1 | 11/2006 |
| JP | 2003118462 | A | 4/2003 |
| KR | 0159336 | B1 | 12/1998 |
| WO | 2013088264 | A1 | 6/2013 |

* cited by examiner

*Primary Examiner* — Anthony D Barfield
(74) *Attorney, Agent, or Firm* — Vichit Chea; Price Heneveld LLP

(57) ABSTRACT

A headrest assembly for a seat, wherein the headrest assembly comprises first and second headrest portions, the first and second headrest portions being movable relative to each other in a lateral direction, such that in a first configuration the first and second headrest portions are combined and form a single headrest for a single occupant of the seat, and in a second configuration, the first and second headrest portions are laterally spaced apart and form separate headrests for respective first and second occupants of the seat.

18 Claims, 13 Drawing Sheets

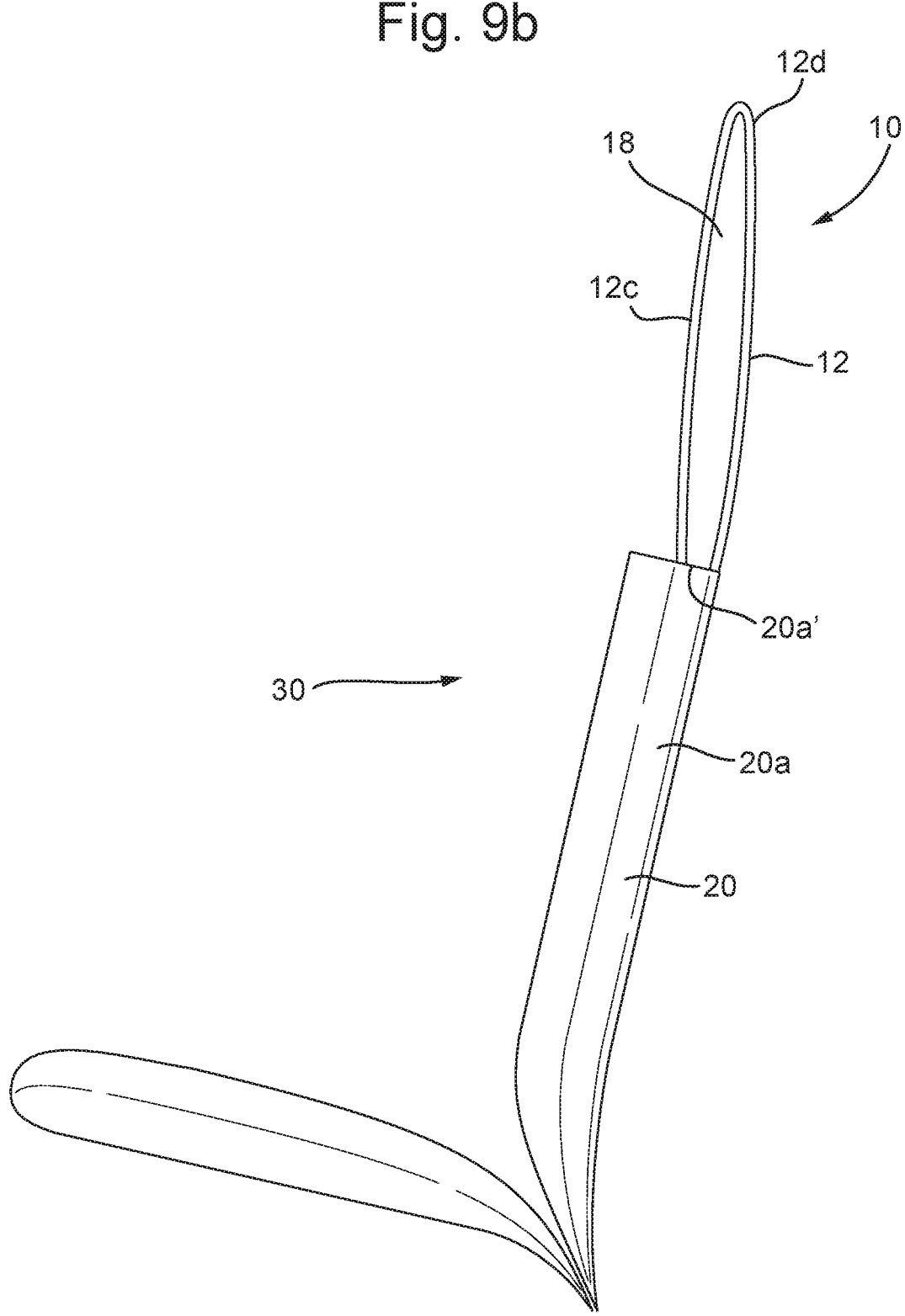

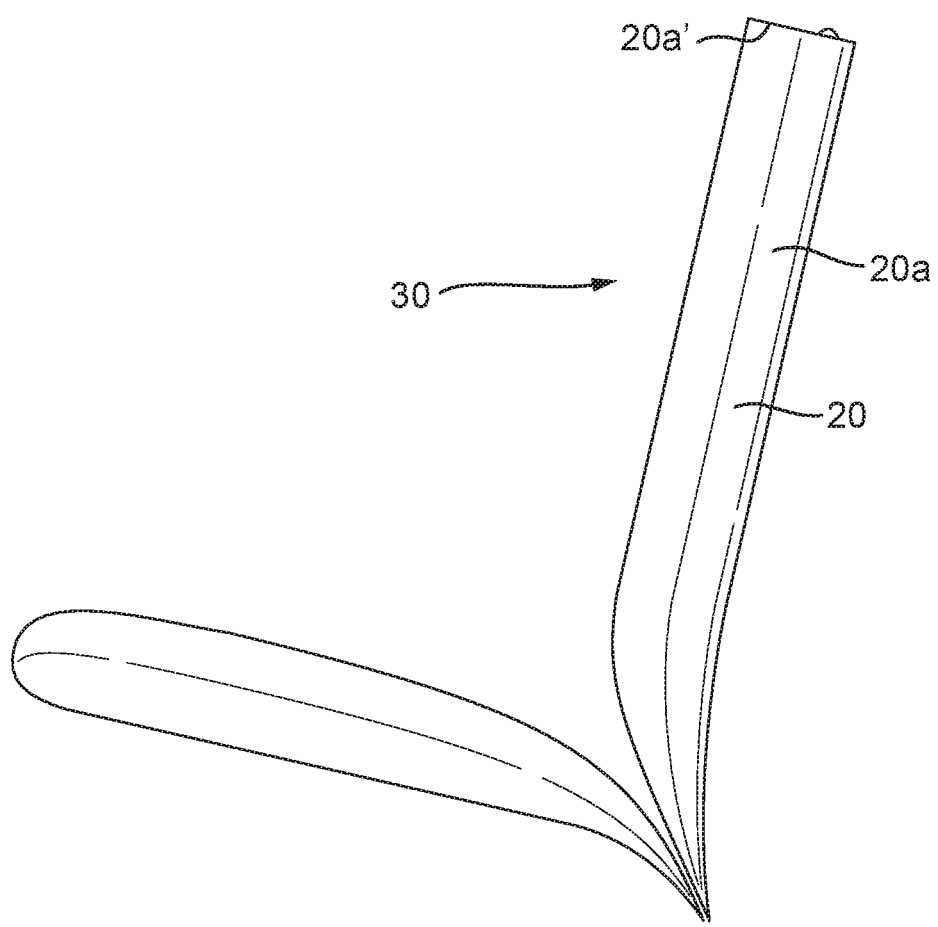

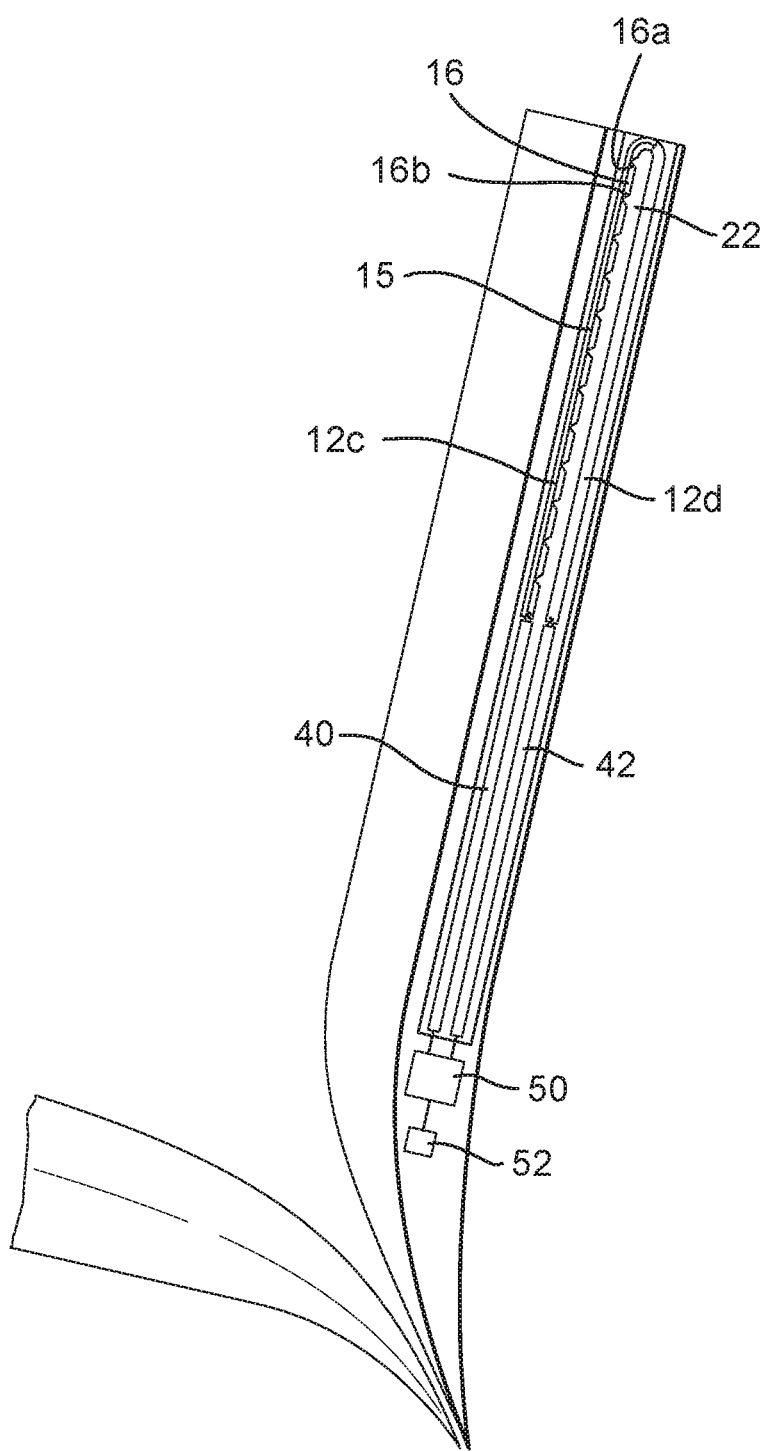

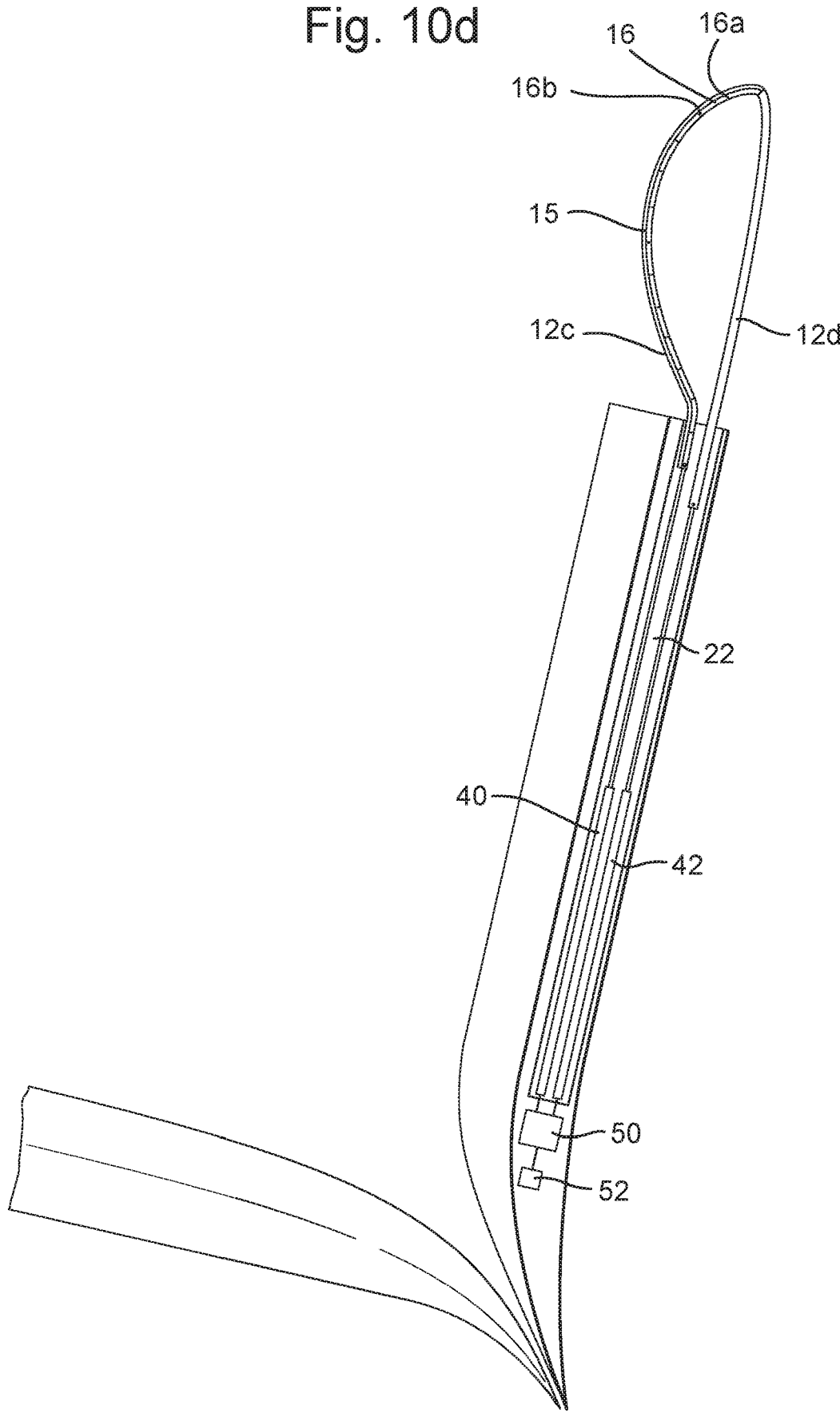

HEADREST ASSEMBLY

FIELD OF THE INVENTION

The present invention generally relates to a headrest assembly, and more particularly relates to a headrest assembly comprising first and second headrest portions that are movable with respect to one another in a lateral direction.

BACKGROUND OF THE INVENTION

In a vehicle, such as a motor vehicle, it is generally known to provide reconfigurable seats. For example, a seat may be adapted according to the position of the seat and the desired number of occupants. However, as seats of the vehicle are reconfigured, it is generally desirable that each occupant has a headrest.

SUMMARY OF THE INVENTION

According to a first aspect of the present disclosure, there is provided a headrest assembly for a seat, wherein the headrest assembly comprises first and second headrest portions, the first and second headrest portions being movable relative to each other in a lateral direction of the headrest, such that in a first configuration the first and second headrest portions are combined and form a single headrest for a single occupant of the seat, and in a second configuration, the first and second headrest portions have moved relative to each other so as to form respective headrests for first and second occupants of the seat. The first and second headrest portions overlap when in the first configuration. The first headrest portion comprises a void between front and back surfaces of the headrest and the void receives the second headrest portion in the first configuration. The second headrest portion is expandable such that the second headrest portion has a thickness that is larger in an expanded state than in a non-expanded state. The second headrest portion may be retractable into the void of the first headrest portion when in the non-expanded state.

The first and second headrest portions may be laterally spaced apart in the second configuration. The first and second headrest portions may form separate headrests for respective first and second occupants of the seat in the second configuration. The lateral direction may be perpendicular to a sagittal plane of the occupant resting on the headrest. Accordingly, the lateral direction may correspond to a lateral direction of the seat as well.

The overlap may occur in the lateral direction, such that the overlap may be apparent when viewed from a front or back of the headrest. The first and second headrest portions may overlap when in the first configuration such that lateral ends of the first headrest portion may be aligned with respective lateral ends of the second headrest portion.

The second headrest portion may be sized to fit inside the void of the first headrest portion. The second headrest portion may be substantially the same size as the first headrest portion when the second headrest portion is in the expanded state.

At least one of the first and second headrest portions may comprise a pair of supports at respective lateral ends of the headrest and a membrane extending between the pair of supports. An occupant's head may rest on the membrane suspended between the supports.

The rigidity of at least one of the supports for a particular headrest portion may be selectively variable. For example, at least one of the supports may comprise a shape memory material (such as a shape memory alloy (SMA) or polymer), that may be activated to return the support to a particular shape. By contrast, the shape memory material may be deactivated to allow the support to relax. At least one of the supports may additionally or otherwise comprise a cable that may be tensioned to provide rigidity to the support. Tension in the cable may be reduced to allow the support to flex.

At least one of the first and second headrest portions may be slidably coupleable to the seat such that at least one of the first and second headrest portions are movable from a stowed position, in which at least one of the first and second headrest portions may be stowed within a seat back of the seat, to a deployed position, in which at least one of the first and second headrest portions may extend from the seat back.

At least one of the first and second headrest portions may be expandable from a collapsed state to an expanded state, such that at least one of the first and second headrest portions have a thickness that may be larger in the expanded state than in the collapsed state. The headrest assembly (whether in the first or second configuration) may be retractable into the stowed position in the seat back when in the collapsed state.

At least one of the first and second headrest portions may comprise a collapsible structure configured to collapse and expand between the collapsed and expanded states. The collapsible structure may comprise a flexible layer and a plurality of wedge-shaped members sequentially arranged on the flexible layer. Non-parallel wedge surfaces of the wedge-shaped members may be in successive engagement so as to define a curved surface when the first and second headrest portions are in the expanded state. The wedge-shaped members may correspond to the voussoirs of an arch. By contrast, the wedge-shaped members may be arranged on the flexible layer such that the non-parallel wedge surfaces of the wedge-shaped members may be out of engagement in the collapsed state. The lateral end supports may each comprise the collapsible structure.

At least one of the first and second headrest portions may comprise a front portion and a back portion. The front portion may comprise the flexible layer and wedge-shaped members. The flexible layer may be connected to the back portion at a top end of the front and back portions. The back portion may be substantially rigid. A bottom end of the front portion may be slidably coupled to the seat back. The back portion may be slidably coupled to the seat back. There may be a void, such as a space, between the front and back portions when the headrest portion is in the expanded state. The void may be smaller or substantially absent when the headrest portion is in the collapsed state. The headrest portion may be open at lateral ends of the headrest portion such that the void extends through a width of the headrest portion when in the expanded state.

The headrest assembly may comprise at least one actuator, such as a linear actuator, configured to move at least one of the headrest portions between the stowed and deployed positions. The actuator may be arranged so as to cause the back portion to move upwards when the headrest portion moves from the stowed position to the deployed position. The actuator or a further actuator may be arranged so as to cause a bottom end of the front portion to move upwards relative to the back portion so that the headrest moves into the expanded state.

The actuator may be configured to adjust a height of the headrest portion relative to the seat back. The actuator may adjust the height of the headrest portion relative to the seat back by adjusting the height of the back portion. The actuator or further actuator may adjust the thickness of the headrest portion by varying the extent of relative movement between the front and back portions.

Each of the first and second headrest portions may comprise a support arm that is configured to extend into the seat.

The headrest assembly may comprise at least one actuator, such as a linear actuator, configured to selectively move at least one of the first and second headrest portions between the first and second configurations.

The headrest assembly may further comprise a controller configured to control any of the actuators. The headrest assembly may further comprise a user interface for a user to select the first or second configurations of the headrest portions. The user may request lateral expansion of the seat and the controller may automatically move the headrest portions into the second configuration or vice versa. The user interface may allow the user to select the stowed or deployed position of at least one of the headrest portions. The user interface may be in communication with the controller. The user interface may also allow the user to select the height and/or thickness of the headrest.

A seat assembly may comprise the aforementioned headrest assembly. The seat may comprise a laterally extending slot for at least one of the first and second headrest portions to travel in. The slot may be provided in a seat back of the seat.

The seat may be laterally extendable from a contracted configuration in which the seat may have a width for accommodating a single occupant to an extended configuration in which the seat may have a width for accommodating first and second occupants. The seat may comprise a seat bottom and seat back. The seat bottom and seat back may be laterally extendable. At least one of the first and second headrest portions may be coupled to a mechanism for laterally extending the seat so that the first and second headrest portions may move in synchronization with the lateral expansion and contraction of the seat. The first and second headrest portions may be mechanically or electronically coupled, e.g., via a common controller, to the mechanism for laterally extending the seat.

According to a second aspect of the disclosure, a headrest assembly for a seat is provided that includes first and second headrest portions movable relative to each other in a lateral direction, such that in a first configuration the first and second headrest portions overlap to form a single headrest, and in a second configuration, the first and second headrest portions have moved relative to each other to form first and second headrests.

According to a third aspect of the disclosure, a vehicle seat assembly is provided. The vehicle seat assembly includes a seat back, and first and second headrest portions coupled to the seat back and movable relative to each other in a lateral direction, such that in a first configuration the first and second headrest portions overlap to form a single headrest, and in a second configuration, the first and second headrest portions have moved relative to each other to form separate headrests.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9b is a side view of the seat assembly comprising the headrest assembly of FIG. 9a depicting the headrest in an intermediate deployed position;

FIG. 9c is a side view of a seat assembly comprising a headrest assembly of FIG. 9a depicting the headrest in a stowed position;

FIG. 10a is a side schematic view of the seat assembly comprising the headrest according to an arrangement of the present disclosure depicting the headrest in the stowed position;

FIG. 10d is a side schematic view of the seat assembly comprising the headrest of FIG. 10a depicting the headrest in the deployed position; and FIG. 10e is an enlarged side view showing a close up view of a portion of the headrest assembly of FIG. 10a.

DETAILED DESCRIPTION OF THE PREFERRED EMBODIMENTS

Figure 1A:
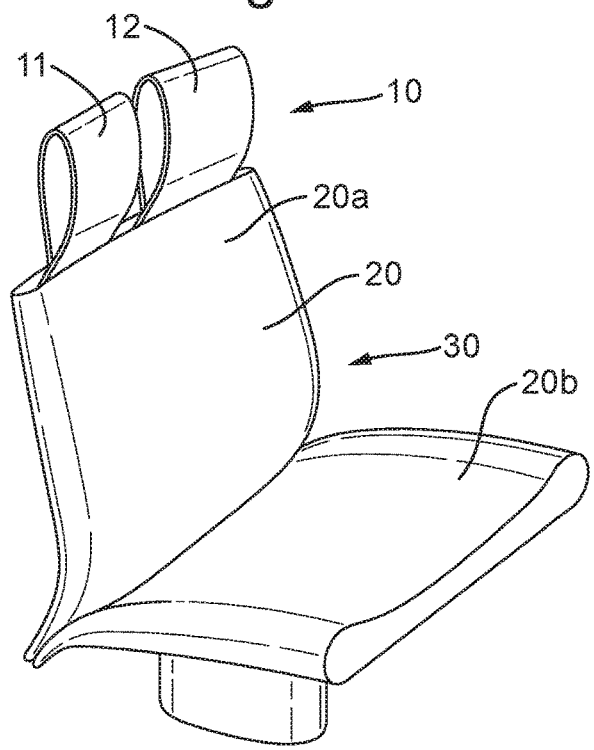
FIG. 1a is a perspective view of a laterally expandable seat and headrest assembly according to one embodiment of the present disclosure depicting the seat and headrest in an expanded state.
Figure 1B:
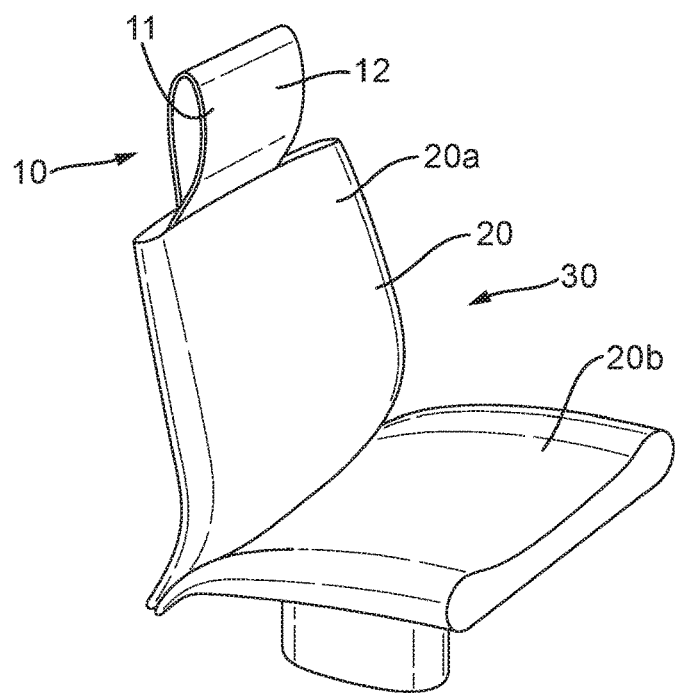
FIG. 1b is a perspective view of the laterally expandable seat and headrest assembly depicting the seat and headrest in an intermediate state.
Figure 1C:
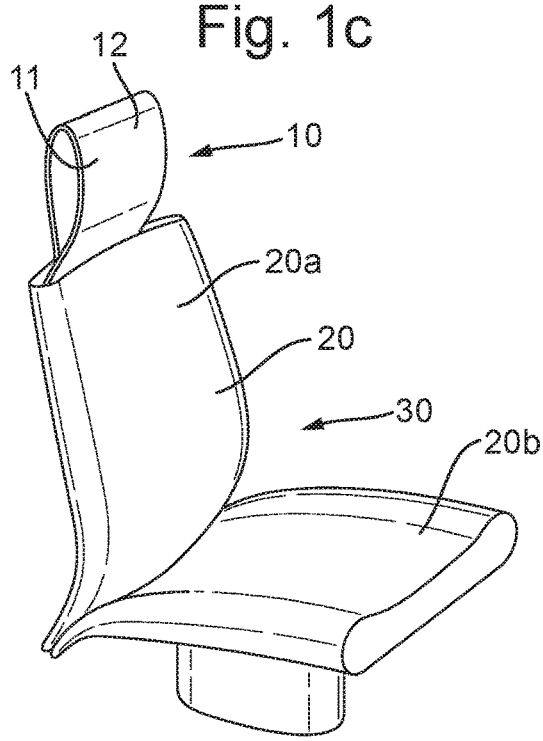
FIG. 1c is a perspective view of the laterally expandable seat and headrest assembly depicting the seat and headrest in a contracted state.

With reference to FIGS. 1a-1c the present disclosure relates to a headrest assembly 10 for a seat 20. The headrest assembly 10 and seat 20 may together form a seat assembly 30. The seat assembly 30 may be provided in a vehicle, such as a motor vehicle. The headrest assembly 10 comprises first and second headrest portions 11, 12, which are movable relative to each other in a lateral direction of the headrest. As depicted in FIGS. 1b and 1c, the first and second headrest portions 11, 12 may be combined in a first configuration and may form a single headrest for a single occupant of the seat 20. By contrast, as depicted in FIG. 1a, the first and second headrest portions 11, 12 may have moved relative to each other in a second configuration and may form respective headrests for first and second occupants of the seat 20. In particular, the first and second headrest portions 11, 12 may be laterally spaced apart in the second configuration. FIG. 1b shows an intermediate position between the first and second configurations.

The seat 20 may be permanently wide enough to accommodate two occupants side by side. Alternatively, as depicted in FIGS. 1a-1c, the seat 20 may be laterally extendable from a contracted configuration (shown in FIG. 1c), in which the seat may have a width for accommodating a single occupant, to an extended configuration (shown in FIG. 1a), in which the seat may have a width for accommodating first and second occupants. The seat 20 may comprise a seat bottom 20b and seat back 20a and both the seat bottom and seat back may be laterally extendable.

At least one of the first and second headrest portions 11, 12 may be mechanically or electronically coupled, e.g., via a common controller, to a mechanism for laterally extending the seat 20. In this way, the first and second headrest portions 11, 12 may move between the first and second configurations in synchronization with the lateral expansion and contraction of the seat 20. However, it is also contemplated that the first and second headrest portions 11, 12 may move between the first and second configurations independently of the lateral extension of the seat 20.

Figure 2A:
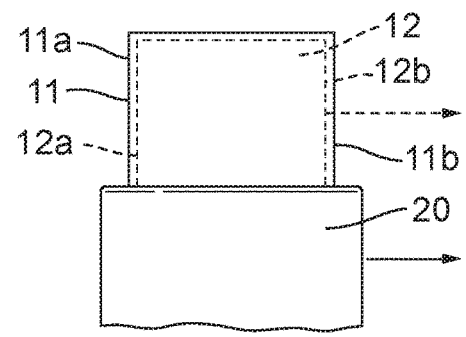
FIG. 2a is a front view of the seat and headrest assembly depicting the headrest assembly in a first configuration.
Figure 2B:
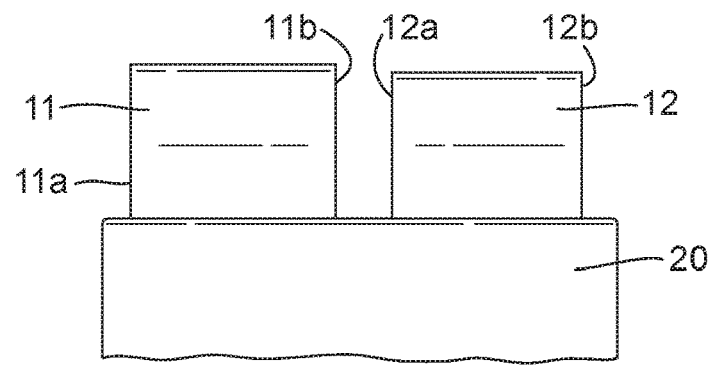
FIG. 2b is a front view of the seat and headrest assembly depicting the headrest assembly in a second configuration.
Figure 3A:
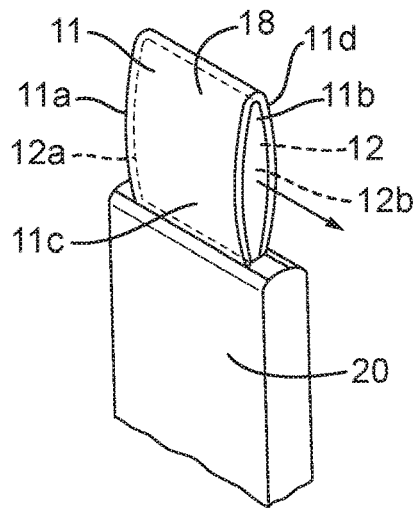
FIG. 3a is a perspective view of a seat and headrest assembly according to another arrangement of the present disclosure depicting the headrest assembly in the first configuration.
Figure 3B:
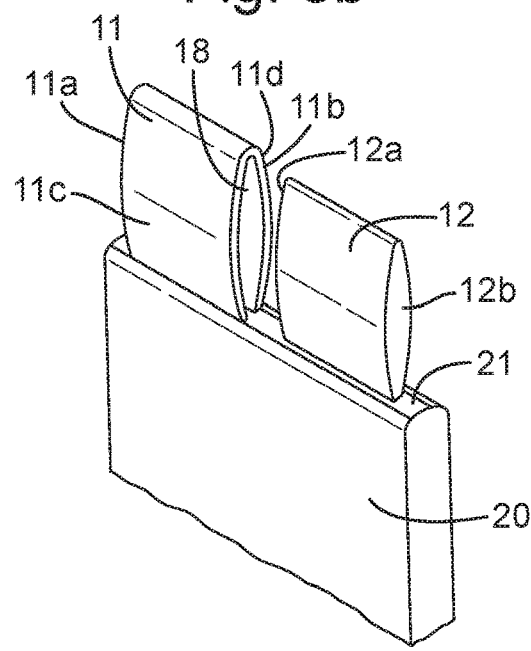
FIG. 3b is a perspective view of the seat and headrest assembly of FIG. 3a depicting the headrest assembly in the second configuration.
Figure 4A:
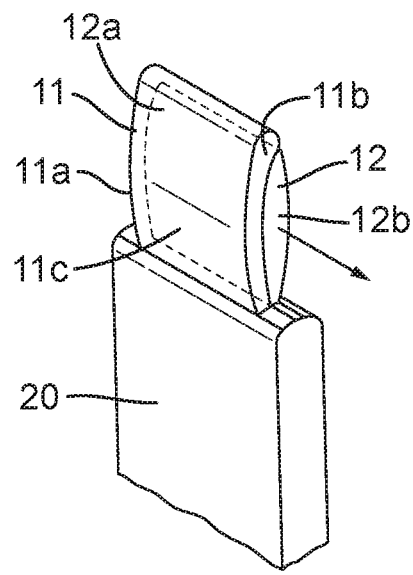
FIG. 4a is a perspective view of a seat and headrest assembly according to another arrangement of the present disclosure depicting the headrest assembly in a first configuration.
Figure 4B:
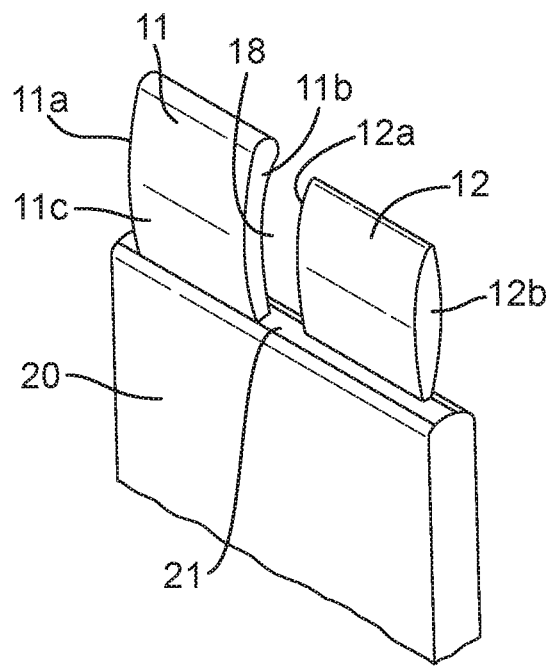
FIG. 4b is a perspective view of the seat and headrest assembly of FIG. 4a depicting the headrest assembly in a second configuration.

With reference to FIGS. 2a, 3a and 4a, the first and second headrest portions 11, 12 may overlap including completely overlap, when in the first configuration. For example, in the first configuration, lateral ends 11a, 11b of the first headrest portion 11 may be substantially aligned with respective lateral ends 12a, 12b of the second headrest portion 12. By contrast, FIGS. 2b, 3b and 4b show the first and second headrest portions 11, 12 in the second configuration in which the respective lateral ends are out of alignment. In the particular examples shown, the first and second headrest portions 11, 12 are spaced apart such that second lateral end 11b of the first headrest portion 11 is spaced apart from a first lateral end 12a of the second headrest portion. However, it is also contemplated that in the second configuration, the second lateral end 11b of the first headrest portion 11 may be aligned with the first lateral end 12a of the second headrest portion.

As depicted in FIGS. 3a and 3b, the first headrest portion 11 may comprise a void 18 between front and back portions 11c, 11d of the first headrest portion. The void 18 may receive the second headrest portion 12 in the first configuration. Accordingly, the second headrest portion 12 may be sized and shaped to fit inside the void 18 of the first headrest portion. In particular, the second headrest portion may be smaller than the first headrest portion 11. The void 18 may be open at one or more of the lateral ends 11a, 11b of the first headrest portion 11.

In an alternative arrangement shown in FIGS. 4a and 4b, the void 18 of the first headrest portion 11 may not be enclosed around the back of the first headrest portion 11. In other words, the back portion 11d of the first headrest portion may be omitted. As a result, the second headrest portion 12 may reside behind substantially all of the first headrest portion 11 when in the first configuration.

In the examples shown in FIGS. 2a-4b, the second headrest portion 12 may be smaller than the first headrest portion 11, at least when in the first configuration. However, the second headrest portion 12 may be expandable such that the second headrest portion 12 may have a thickness that is larger in an expanded state than in a non-expanded state. For example, the second headrest portion 12 may be retractable into the void 18 of the first headrest portion when in the non-expanded state. The second headrest portion 12 may be substantially the same size as the first headrest portion 11 when the second headrest portion is in the expanded state.

Figure 5A:
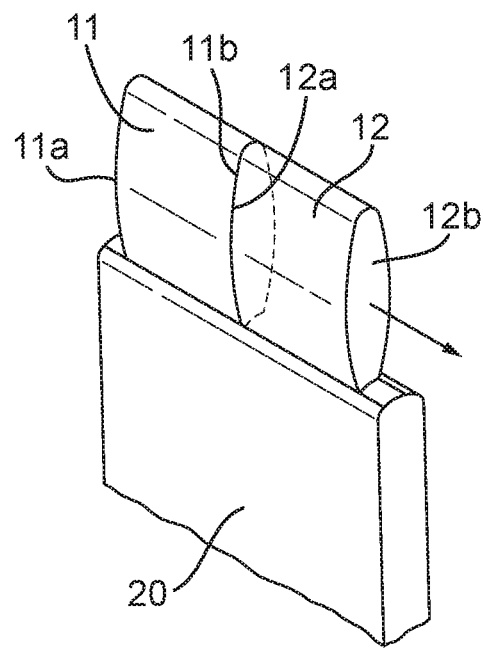
FIG. 5a is a perspective view of a conventional seat and headrest assembly according to a comparative example of the present disclosure not forming part of the present invention depicting the headrest assembly in a first configuration.
Figure 5B:
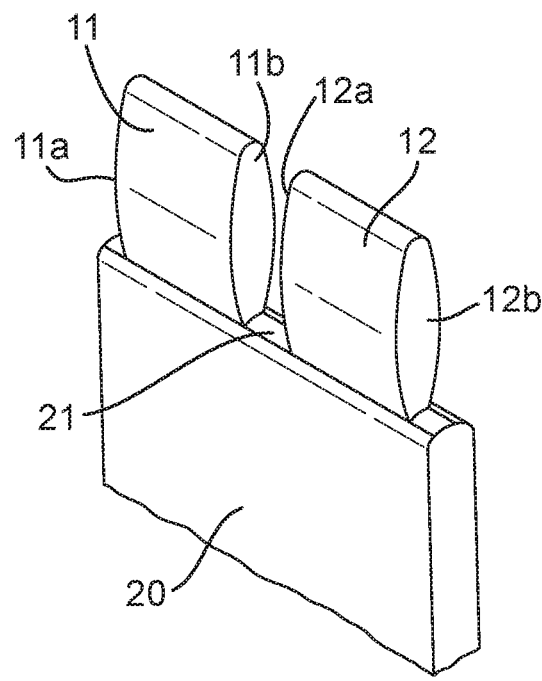
FIG. 5b is a perspective view of the conventional seat and headrest assembly according to a comparative example of the present disclosure not forming part of the present invention depicting the headrest assembly in a second configuration.

With reference to FIGS. 5a and 5b, the first and second headrest portions 11, 12 may not overlap when in the first configuration. Instead, the second lateral end 11b of the first headrest portion 11 may abut the first lateral end 12a of the second headrest portion 12 when in the first configuration. The facing lateral ends 11b, 12a of the first and second headrest portions may be held together in the first configuration by one or more magnets.

One or more of the first and second headrest portions 11, 12 may comprise a support arm that is configured to extend into the seat 20 and support the respective headrest portion relative to the seat. The seat 20 may comprise a laterally extending slot 21 for at least one of the first and second headrest portions to travel in. The slot 21 may be provided in the seat back 20a of the seat 20. The support arm of a particular headrest portion 11, 12 may slide in the slot 21.

Furthermore, the headrest assembly 10 or seat 20 may comprise at least one actuator, such as a linear actuator, configured to selectively move at least one of the first and second headrest portions 11, 12 between the first and second configurations. The actuator may act on the support arm so as to cause the support arm to slide in the slot and thereby move the headrest portion in a lateral direction.

Figure 6:
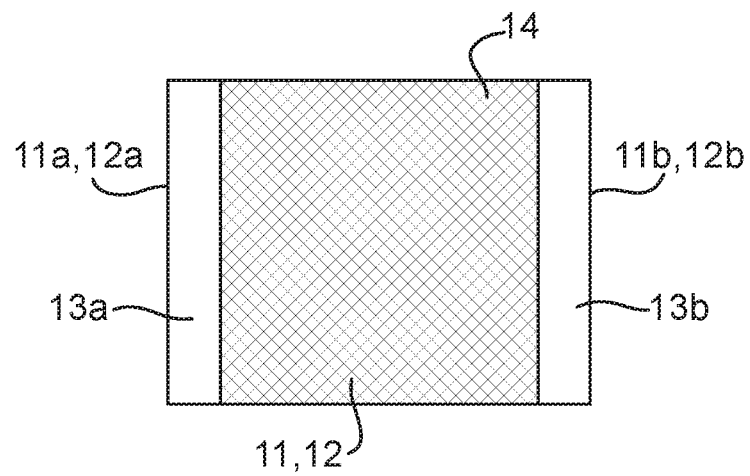
FIG. 6 is a front view of a headrest assembly according to an arrangement of the present disclosure.

With reference to FIG. 6, at least one of the first and second headrest portions 11, 12 may comprise a pair of substantially rigid supports 13a, 13b at respective lateral ends of the headrest portion. A flexible membrane 14 may extend between the pair of supports 13a, 13b. The membrane 14 may be made from a fabric or any other sheet type material and may be stretched between the pair of supports 13a, 13b. An occupant's head may rest on the membrane 14 suspended between the supports 13a, 13b.

Figure 7:
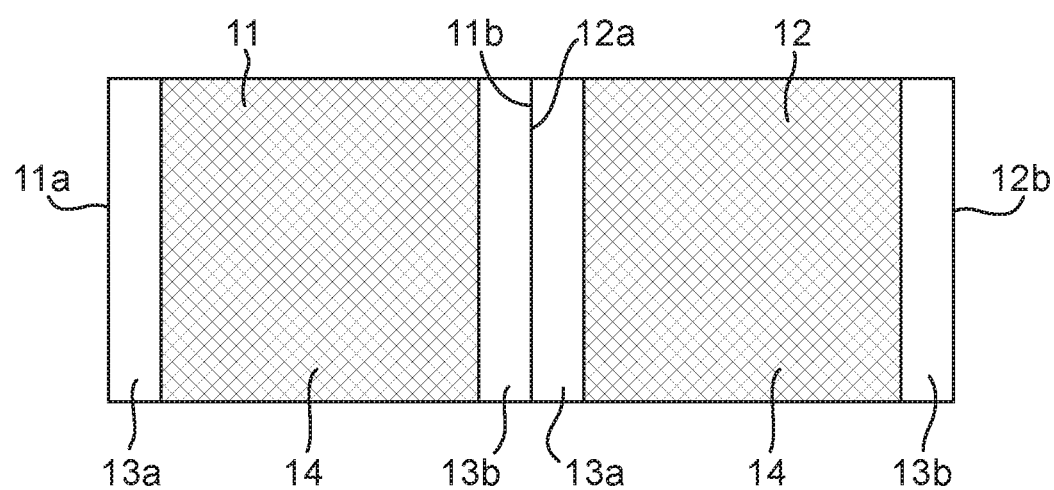
FIG. 7 is a front view of a headrest assembly according to an arrangement of the present disclosure.

With reference to FIG. 7, each of the first and second headrest portions 11, 12 may comprise a pair of substantially rigid supports 13a, 13b at respective lateral ends of the headrest portion and a flexible membrane 14 may extend between the pair of supports 13a, 13b (as described above in relation to FIG. 6). In the case of the second lateral end 11b of the first headrest portion 11 abutting the first lateral end 12a of the second headrest portion 12 in the first configuration, the rigidity of the support 13b from the first headrest portion 11 and the adjacent support 13a from the second headrest portion 12 may be selectively variable. In particular, the rigidity of the support 13b from the first headrest portion 11 and the adjacent support 13a from the second headrest portion 12 may be reduced when in the first configuration. To achieve the variable rigidity, at least one of the supports 13a, 13b may comprise a shape memory material, such as a shape memory alloy (SMA) or polymer, that may be activated to return the support to a particular shape. By contrast, the shape memory material may be deactivated to allow the support to relax, such as when adjacent supports 13a, 13b of headrest portions 11, 12 are in abutment. In this way, an occupant's head may rest on the adjacent supports 13a, 13b in the first configuration and the rigidity of the supports may be reduced in the middle of the combined headrest to improve the comfort for the occupant.

Figure 8A:
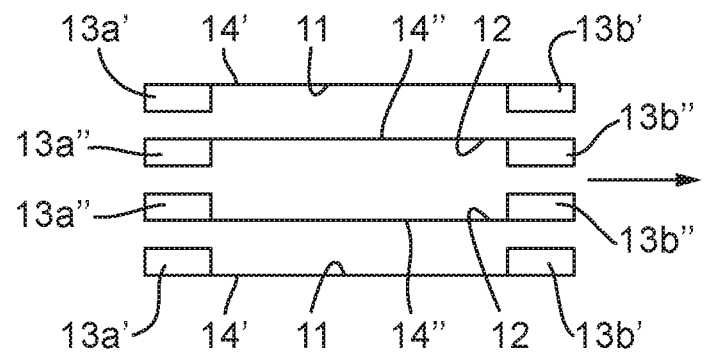
FIG. 8a is a schematic sectional view from above of a headrest assembly according to an arrangement of the present disclosure depicting the headrest portion in a first configuration.
Figure 8B:
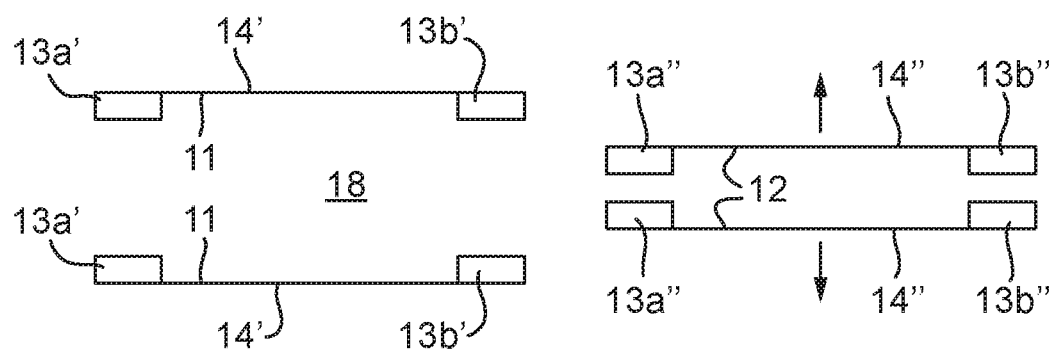
FIG. 8b is a schematic sectional view from above of the headrest assembly of FIG. 8a depicting the headrest portion in a second configuration.
Figure 8C:
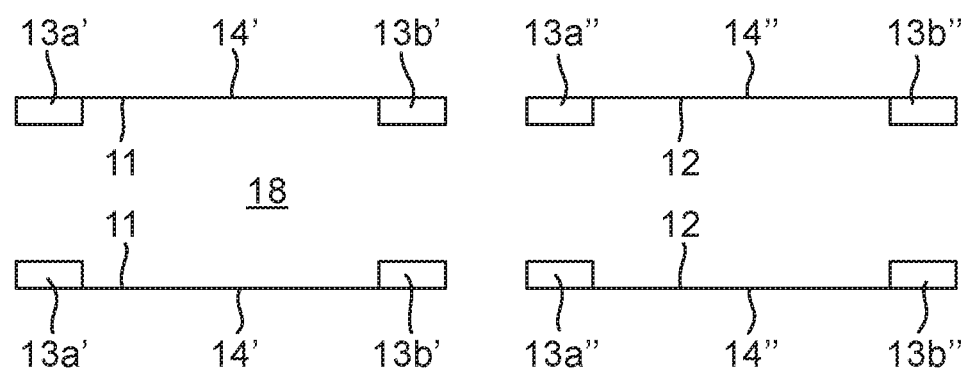
FIG. 8c is a schematic sectional view from above of a headrest assembly of FIG. 8a depicting the headrest portion in an expanded position.

With reference to FIGS. 8a-8c, the headrest portion 11, 12 shown in FIG. 6, may apply to the arrangement in which the first and second headrest portions 11, 12 overlap in the first configuration, such as depicted in FIGS. 3a and 3b. The supports 13a', 13b' and membrane 14' of the first headrest portion 11 may define the void 18 and, as depicted in FIG. 8a, the second headrest portion 12 may reside within the void when in the first configuration. The second headrest portion 12 may also comprise supports 13a", 13b" and membrane 14". As depicted in FIG. 8b, the second headrest portion 12 may move out of the void 18 and into the second configuration. In addition, as shown in FIG. 8c, the second headrest portion 12 may be enlarged by expanding the spacing of the supports 13a" and 13b" in a direction perpendicular to the lateral direction of the headrest. The second headrest portion 12 may then substantially match the size of the first headrest portion 11.

Figure 9A:
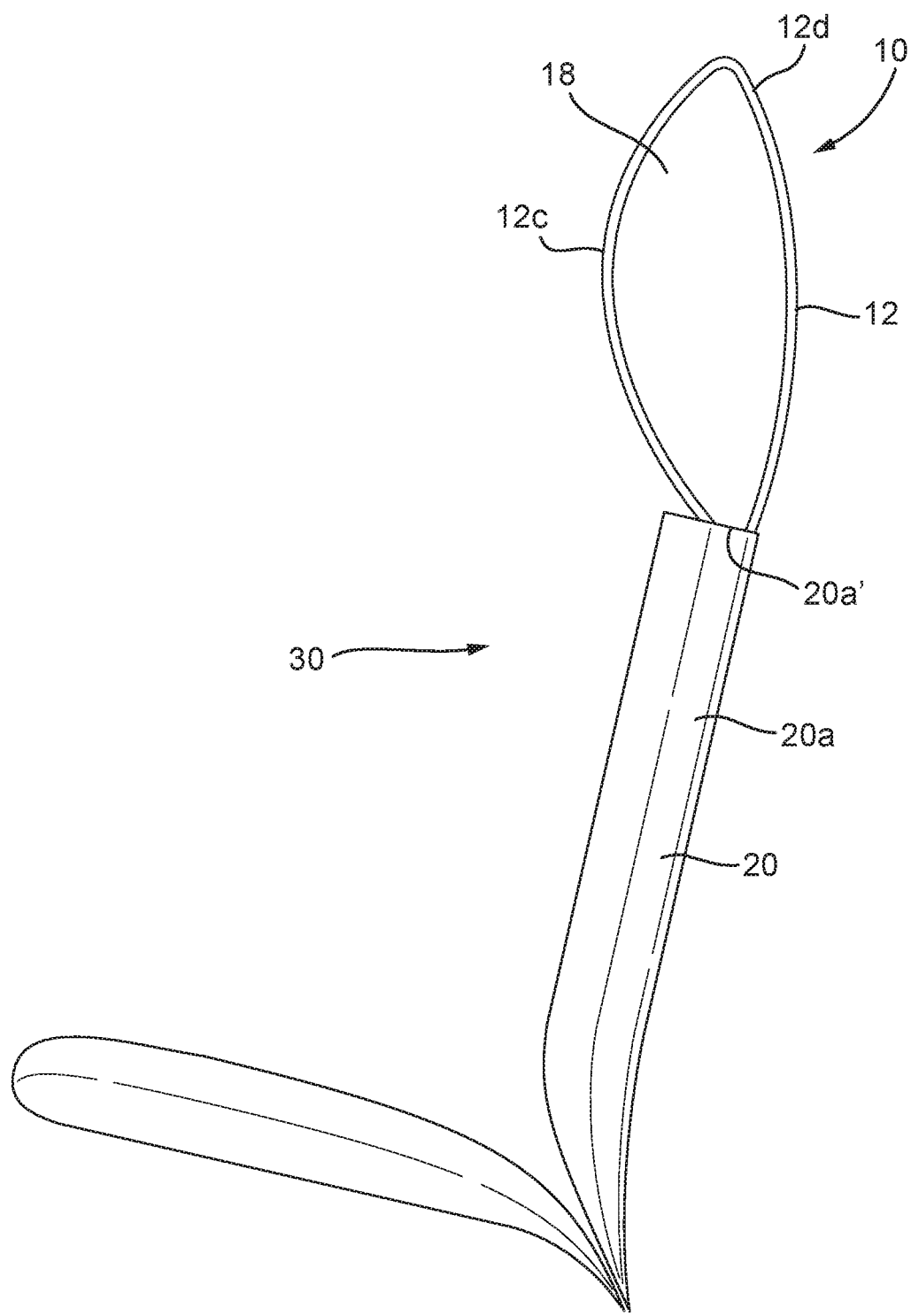
FIG. 9a is a side view of a seat assembly comprising a headrest assembly according to an arrangement of the present disclosure depicting the headrest in a deployed position.
Figure 10B:
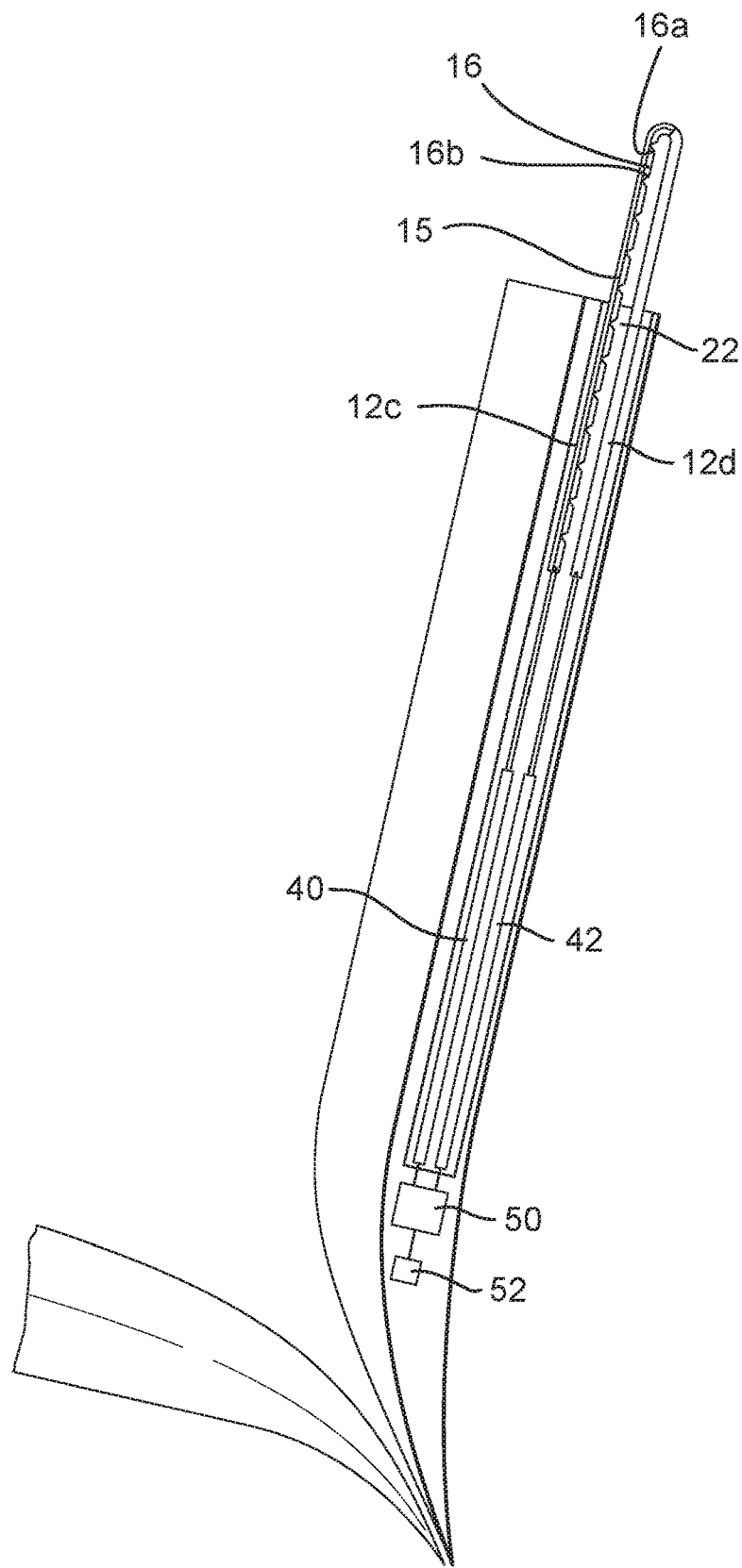
FIG. 10b is a side schematic view of the seat assembly comprising the headrest of FIG. 10a depicting the headrest in the stowed position.

With reference to FIGS. 9a-10e, one or both of the first and second headrest portions 11, 12 may also be slidably coupled to the seat 20 such that at least one of the headrest portions 11, 12 is movable from a stowed position as depicted in FIGS. 9c and 10a, in which the headrest portion 11, 12 is stowed within a seat back 20a of the seat 20, to a deployed position as depicted in FIGS. 9a and 10d, in which the headrest portion 11, 12 extends from the seat back 20a. FIGS. 9a-9c and 10a-10e depict the second headrest portion 12, but these figures and the associated description may equally apply to the first headrest portion 11 in addition to or instead of the second headrest portion 12.

In addition to being slidably disposed with respect to the seat 20, the headrest portion 12 may be expandable from a collapsed state to an expanded state such that the headrest portion 12 has a thickness that is larger in the expanded state than in the collapsed state. The thickness of the headrest portion may be measured in the fore-aft direction of the seat 20. FIGS. 9a and 10d depict the headrest portion 12 in the expanded state, whereas FIGS. 9b, 10a and 10b depict the headrest portion 12 in the collapsed state.

The seat back 20a comprises a cavity 22, which is sized to receive the headrest portion 12 when in the collapsed state. In particular, the cavity 22 may have a thickness that is less than the thickness of the headrest portion 12 in the expanded state. The cavity thickness may otherwise be greater than or equal to the thickness of the headrest portion 12 in the collapsed state. The cavity 22 may have an opening at a top end 20a' of the seat back 20a and the headrest portion 12 may pass through the opening when moving from the stowed position to the deployed position. It will be appreciated that the headrest portion 12 may only be retractable into the stowed position in the seat back when the headrest portion is in the collapsed state. Furthermore, an interaction of the headrest portion 12 with an edge of the opening may encourage the headrest portion to move into the collapsed state when the headrest portion is moved into the stowed position.

Figure 10C:
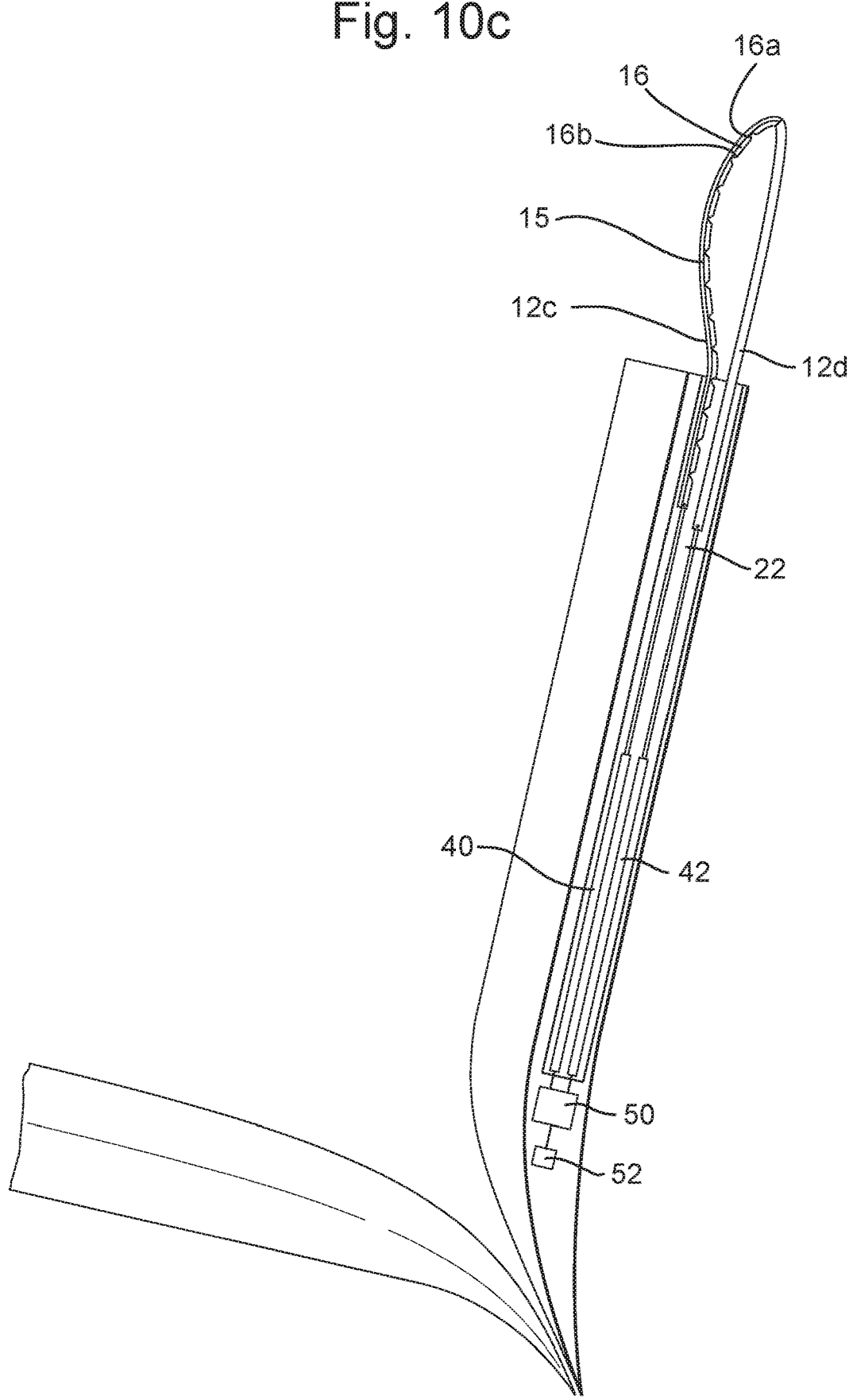
FIG. 10c is a side schematic view of the seat assembly comprising the headrest of FIG. 10a depicting the headrest in the stowed position.

The headrest portion 12 may comprise a collapsible structure configured to collapse and expand between the collapsed and expanded states. In the particular example shown, the collapsible structure may comprise a flexible membrane 15 and a plurality of elongate wedge-shaped members 16 that are sequentially arranged on the flexible membrane. The elongate wedge-shaped members 16 may be arranged with a longitudinal axis extending in a lateral direction of the seat 20. Some or all of the wedge-shaped members 16 may comprise non-parallel (e.g., tapered) wedge surfaces 16a, 16b on either side of a particular wedge-shaped member 16. As depicted in FIG. 10d, the wedge surfaces 16a, 16b may contact the wedge surfaces of a neighboring wedge-shaped member 16 when the headrest 12 is in the expanded state. As the wedge surfaces 16a, 16b of at least some of the wedge-shaped member 16 may not be parallel, the successive engagement of the wedge-shaped members 16 forms a curved surface when the headrest 12 is in the expanded state. By contrast, in the collapsed state depicted in FIGS. 10a and 10b, the corresponding wedge surfaces of neighboring wedge-shaped members 16 may be out of engagement such that the flexible membrane 15 and wedge-shaped members 16 may form a substantially flat structure. FIG. 10c depicts an intermediate position between the collapsed and expanded states.

The headrest 12 may comprise a front portion 12c and a back portion 12d. The front portion 12c may comprise the flexible membrane 15 and wedge-shaped members 16. The flexible membrane 15 may be connected to the back portion 12d at a top end of the front and back portions 12c, 12d. In contrast to the front portion 12c, the back portion 12d may be substantially rigid. In addition, the back portion 12d may be substantially straight. The back portion 12d may be slidably coupled to the seat back 20a. A bottom end of the front portion 12c may be slidably coupled to the seat back 20a.

In the expanded state, the front and back portions 12c, 12d of the headrest may form a loop that encloses a void 18 between the front and back portions 12c, 12d. In the collapsed state, the void 18 may be reduced in size and may be absent altogether. The headrest 12 may be open at lateral ends of the headrest such that the void 18 extends through a width of the headrest when in the expanded state.

Referring still to FIGS. 10a-10e, the headrest assembly 10 may comprise at least one actuator configured to move the headrest between the stowed and deployed positions. In the particular example shown, the headrest assembly 10 comprises a first actuator 40 and a second actuator 42. The first and second actuators 40, 42 may be linear actuators or they may be any other type of actuator that is configured to move the headrest 12 between the stowed and deployed positions. In the depicted arrangement, the second actuator 42 is connected to the back portion 12d of the headrest and is configured to move the back portion 12d in an upwards direction to move the headrest from the stowed position to the deployed position. In a similar manner, the first actuator 40 is connected to a bottom end of the front portion 12c of the headrest and is configured to move the front portion upwards as the headrest 12 moves from the stowed position to the deployed position. The first actuator 40 may also move the front portion 12c upwards relative to the back portion 12d to cause the headrest 12 to move into the expanded state.

In an alternative embodiment, one of the actuators may be omitted. For example, the second actuator 42 may be omitted and the first actuator 40 may drive the upwards motion of both the front and back portions 12c, 12d. Once the back portion 12d has reached the limit of its upper travel, the first actuator 40 may continue to cause the front portion 12c to move upwards relative to the back portion 12d and thus expand the headrest.

The front and back portions 12c, 12d of the headrest may be guided in their travel by one or more guides in the seat 20 that the front and back portions engage with. The travel of the front and back portions 12c, 12d may be limited by end stops.

The actuators 40, 42 may lockingly hold the front and back portions in the stowed and/or deployed positions. Additionally or alternatively, separate actuatable locks may be provided to selectively hold the front and back portions in place.

The actuators 40, 42 may be further configured to adjust a height of the headrest portion 12 relative to the seat back 20a. In particular, in the deployed position of the headrest portion 12 the first and second actuators 40, 42 may further raise the front and back portions 12c, 12d together to suit the preferences of an occupant of the seat 20. Additionally or alternatively, the first and/or second actuators 40, 42 may adjust the thickness of the headrest portion 12. For example, relative movement of the front portion and back portion 12c, 12d may change the thickness of the headrest portion 12. The wedge-shaped members may be formed from a resilient material, which may allow adjustment of the thickness of the headrest in the expanded state. Additionally or alternatively, the flexible membrane 15 may comprise a resilient material to provide a soft surface for the occupant's head to rest upon.

The headrest assembly 10 may further comprise a controller 50 configured to control any of the above-mentioned actuators, such as the first actuator 40, the second actuator 42 and/or the actuator configured to move the first and second headrest portions between the first and second configurations. The headrest assembly 10 may further comprise a user interface 52, which is operatively connected to the controller 50. The user interface 52 may allow the occupant of the seat 20 to select the stowed or deployed position of the headrest portion 12 and/or the first or second configurations. The user may request lateral expansion of the seat 20 and the controller 50 may automatically move the headrest portions 11, 12 into the second configuration or vice versa. Furthermore, the user interface 52 may also allow the occupant of the seat to select the height and/or thickness of the first and/or second headrest portions 11, 12.

The arrangement depicted in FIGS. 8a-8c and 9a-9c may correspond to that shown in FIGS. 6-8c, e.g., with FIGS. 9a-9c depicting a cross-section of one of the supports 13a, 13b. For example, each of the supports 13a, 13b may comprise the wedge-shaped members 16. Furthermore, the wedge-shaped members 16 may be absent in the region between the supports 13a, 13b in which the membrane 14 is suspended. The membrane 14 may correspond to the flexible membrane 15 or they may be separate membranes.

Figure 10E:
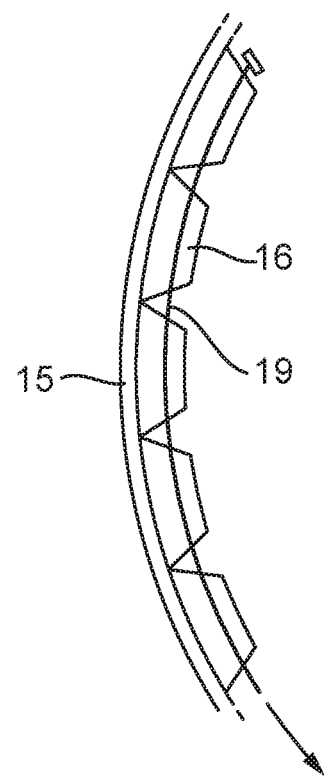

With reference to FIG. 10e, at least one of the supports 13a, 13b may comprise a cable 19 that may be tensioned to provide rigidity to the support. As depicted, the cable 19 may pass through successive wedge-shaped members 16. The cable 19 may be tensioned by pulling one end of the cable 19 relative to the wedge-shaped members 16. The cable 19 may be secured to the support (e.g., a last one of the wedge-shaped members) at the other end of the cable. The resulting tension in the cable 19 may provide additional rigidity to the support 13a, 13b. The cable may be pulled via an actuator, which may be controlled by the controller 50. The tension in the cable 19 may be reduced to allow the support 13a, 13b to flex. The rigidity of adjacent supports 13a, 13b of the first and second headrest portions 11, 12 may be reduced when the first and second headrest portions are provided in the side-by-side relationship of the first configuration, as depicted in FIG. 7.

It will be appreciated by those skilled in the art that although the invention has been described by way of example, with reference to one or more examples, it is not limited to the disclosed examples and alternative examples may be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A headrest assembly for a seat comprising:
   first and second headrest portions movable relative to each other in a lateral direction, such that in a first configuration the first and second headrest portions are combined and form a single headrest for a single occupant of the seat, and in a second configuration, the first and second headrest portions have moved relative to each other to form respective headrests for first and second occupants of the seat,
   wherein the first and second headrest portions overlap when in the first configuration,
   wherein the first headrest portion comprises a void between front and back surfaces of the headrest that receives the second headrest portion in the first configuration, and
   wherein the second headrest portion is expandable such that the second headrest portion has a thickness that is larger in an expanded state than in a non-expanded state, the second headrest portion being retractable into the void of the first headrest portion when in the non-expanded state.

2. The headrest assembly of claim 1, wherein the first and second headrest portions overlap when in the first configuration such that lateral ends of the first headrest portion are aligned with respective lateral ends of the second headrest portion.

3. The headrest assembly of claim 1, wherein the second headrest portion is substantially the same size as the first headrest portion when the second headrest portion is in the expanded state.

4. The headrest assembly of claim 1, wherein at least one of the first and second headrest portions comprises a pair of supports at respective lateral ends of the headrest portion and a membrane extending between the pair of supports.

5. The headrest assembly of claim 4, wherein a rigidity of at least one of the supports is selectively variable.

6. The headrest assembly of claim 1, wherein at least one of the first and second headrest portions is slidably coupleable to the seat such that the headrest portion is movable from a stowed position, in which the headrest portion is stowed within a seat back of the seat, to a deployed position, in which the headrest portion extends from the seat back.

7. The headrest assembly of claim 6, wherein at least one of the first and second headrest portions is expandable from a collapsed state to an expanded state such that the headrest portion has a thickness that is larger in the expanded state than in the collapsed state, the headrest portion being retractable into the stowed position in the seat back when in the collapsed state.

8. The headrest assembly of claim 7, wherein at least one of the first and second headrest portions comprise a collapsible structure configured to collapse and expand between the collapsed and expanded states.

9. The headrest according to claim 8, wherein the collapsible structure comprises a flexible layer and a plurality of wedge-shaped members sequentially arranged on the flexible layer such that non-parallel wedge surfaces of the wedge-shaped members are in successive engagement so as to define a curved surface when the headrest portion is in the expanded state.

10. The headrest according to claim 8, wherein the lateral end supports each comprise the collapsible structure.

11. The headrest assembly of claim 1, wherein at least one of the first and second headrest portions comprises a support arm that is configured to extend into the seat.

12. The headrest assembly of claim 1, wherein the headrest assembly comprises at least one actuator configured to selectively move at least one of the first and second headrest portions between the first and second configurations.

13. A headrest assembly for a seat comprising:
first and second headrest portions movable relative to each other in a lateral direction, such that in a first configuration the first and second headrest portions overlap to form a single headrest, and in a second configuration, the first and second headrest portions have moved relative to each other to form first and second headrests, wherein at least one of the first and second headrest portions is slidably coupleable to the seat such that the headrest portion is movable from a stowed position, in which the headrest portion is stowed within a seat back of the seat, to a deployed position, in which the headrest portion extends from the seat back.

14. The headrest assembly of claim 13, wherein the first headrest portion comprises a void between front and back surfaces of the headrest and the void receives the second headrest portion in the first configuration.

15. The headrest assembly of claim 14, wherein the second headrest portion is expandable such that the second headrest portion has a thickness that is larger in an expanded state than in a non-expanded state, the second headrest portion being retractable into the void of the first headrest portion when in the non-expanded state.

16. A vehicle seat assembly comprising:
a seat back;
first and second headrest portions coupled to the seat back and movable relative to each other in a lateral direction, such that in a first configuration the first and second headrest portions overlap to form a single headrest, and in a second configuration, the first and second headrest portions have moved relative to each other to form separate headrests, wherein the seat is laterally extendable from a contracted configuration in which the seat has a width for accommodating, a single occupant to an extended configuration in which the seat has a width for accommodating first and second occupants, and wherein at least one of the first and second headrest portions is coupled to a mechanism for laterally extending the seat so that the first and second headrest portions move in synchronisation with the lateral expansion and contraction of the seat.

17. The seat assembly of claim 16, wherein the first headrest portion comprises a void between front and back surfaces of the headrest and the void receives the second headrest portion in the first configuration.

18. The seat assembly of claim 17, wherein the second headrest portion is expandable such that the second headrest portion has a thickness that is larger in an expanded state than in a non-expanded state, the second headrest portion being retractable into the void of the first headrest portion when in the non-expanded state.

* * * * *